May 31, 1949. E. DIEBOLD 2,471,729
ELECTROMAGNETIC RECIPROCATING MOTOR
Filed Jan. 2, 1946
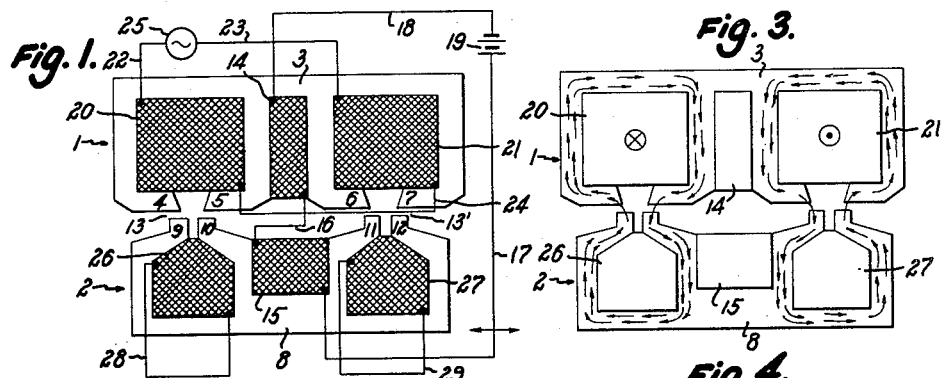
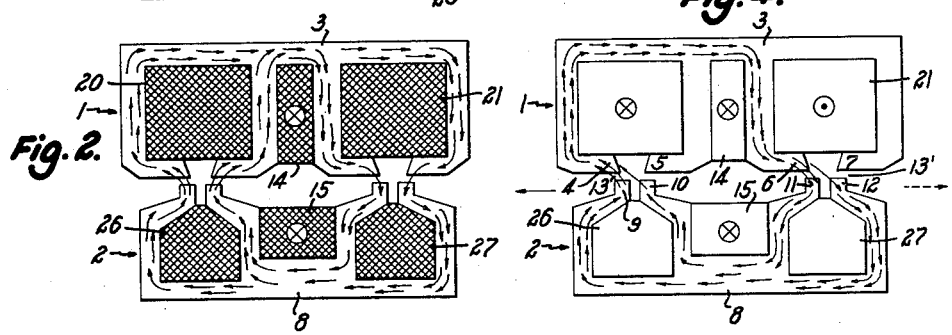
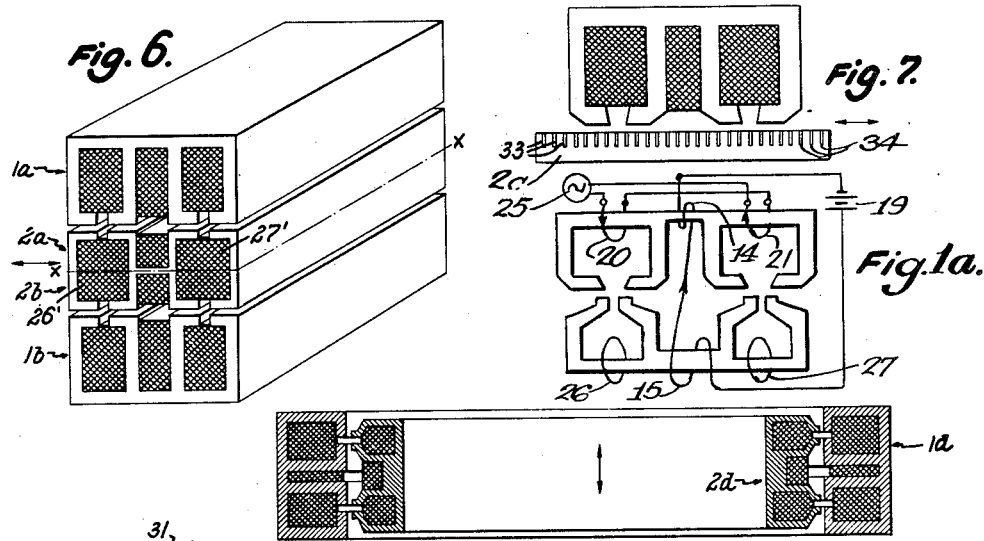
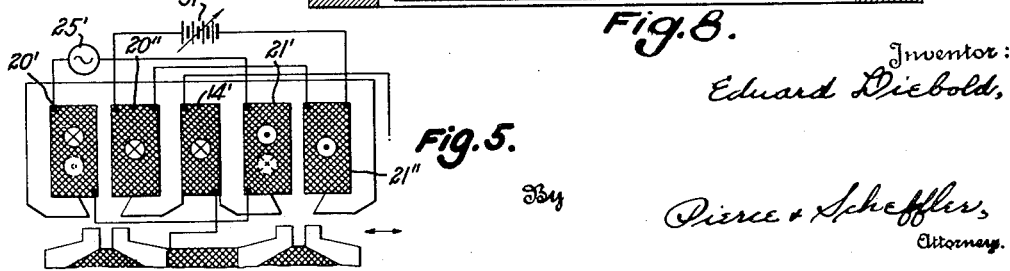
Inventor:
Edward Diebold,
By Pierce & Scheffler,
Attorney.

Patented May 31, 1949

2,471,729

UNITED STATES PATENT OFFICE 2,471,729

ELECTROMAGNETIC RECIPROCATING MOTOR

Eduard Diebold, Zurich, Switzerland, assignor to Aktiengesellschaft Brown, Boveri & Cie, Baden, Switzerland, a joint-stock company Application January 2, 1946, Serial No. 638,668
In Switzerland January 13, 1945

8 Claims. (Cl. 172—126)

This invention relates in general to electric motors and in particular to electromagnetic motors of the reciprocating type.

Present known constructions for the reciprocating type of motor have not been entirely satisfactory for applications where the motor is required to reciprocate at high speeds and where comparatively short stroke is required as is often necessary in control and switching movements, or when it is desired to vary, at will, the stroke, frequency, or center of reciprocation of the reciprocating member.

Electromagnetic motors with grooved magnetized bodies while suitable for many uses in which travel of the movable body is to be regulated cannot, however, be used for applications where short strokes are required because the dimensions of the grooves would then have to be too small to be practical. Other types of electromagnetic reciprocating motors that operate with alternating fields or poles magnetized alternately to produce an intermittent impulse force which is utilized to set a spring-suspended mass into vibration are not practical where variable control of the speed or stroke of the motor is desired because of the fact that in this type of motor, reciprocation is determined by invariable factors such as mass, resiliency, and damping characteristics of the various motor components. These cannot be changed independently of each other by the electromagnetic drive. Furthermore, an arrangement of this kind answers comparatively slowly (independent of the nature of the drive, and with strong inherent vibrations) to changes in oscillation that are to be forced by the drive.

The general object of this invention is to provide an improved electromagnetic motor of the general type described that will produce a linear reciprocating motion which is proportional to and in the same direction as a control current.

More specifically, an object is to provide an electromagnetic motor of the type stated in which the frequency, or stroke or center of reciprocation of the motor may be altered satisfactorily merely by changing the characteristics of the control currents.

In general the basic construction of the motor according to this invention comprises two magnetically coupled bodies of magnetizable material. One of the bodies is provided with at least two sets of double pole pieces. The other body has at least one pole piece arranged opposite each set of double pole pieces to thus provide two sets of double air gaps linking the two bodies. One of the bodies is fixed and the other mounted for movement in a rectilinear path along an axis through the two sets of double pole pieces. An energizing winding carried by one of the bodies is adapted to be energized with direct current to produce a unidirectional magnetic field in the bodies that is closed across the two sets of air gaps between the fixed and movable bodies, the two sets of gaps being oppositely poled. One of the body members also carries windings which are adapted to be excited respectively by control currents of different characteristics. The corresponding magnetic fields produced within the two bodies by these control currents react with the unidirectional field produced by the energizing winding to thereby change the distribution of the resultant magnetic field across the two sets of air gaps between the fixed and movable bodies in accordance with changes in characteristic of the control currents. Since it is basically fundamental that two oppositely poled magnetized members spaced apart by an air gap will be attracted to a position of minimum reluctance, motion of the movable body will hence follow shifts in the axis of the resultant field to thereby produce reciprocating motion.

In the drawings, examples of construction of the invention are shown. Figs. 1 and 1a are schematic views of the relative arrangement of the pole pieces and windings of an electromagnetic motor embodying the invention; Fig. 2 is a schematic view showing the distribution and direction of flow of the magnetic flux produced in the fixed and movable body members when the energizing windings alone are energized with direct current; Fig. 3 is a view similar to Fig. 2 showing the distribution and direction of flow of the magnetic flux produced in the fixed and movable body members when the control windings alone are energized; Fig. 4 is a schematic view showing the distribution and direction of flow of the combined or resultant magnetic flux produced in the fixed and movable body members when both the energizing and control windings are excited and with current flow through the energizing and control windings in the directions indicated by the conventional symbols; Fig. 5 is a schematic view of a modified form of motor embodying the invention wherein additional control windings energized with unidirectional current are provided; Fig. 6 is a perspective view showing one type of motor construction embodying the invention wherein the displacement path between the fixed and movable body members is planar; Fig. 7 is a schematic view of yet another form of the invention using a different type of construction for the pole pieces; and Fig. 8 is a vertical section of still another type of motor construction embodying the invention wherein the fixed and movable body members are annular.

Referring now to the drawings, and particularly to Figs. 1–4, the basic construction of the improved motor comprises two bodies 1 and 2 of magnetizable material. These bodies may be made up into several different forms, each of course embodying the basic construction as shown in Figs. 1–4. One form is shown in Fig. 6; another is shown in Fig. 8.

One of the bodies, such as the body 1 is fixed in position. The other body such as the body 2 is suitably supported by any conventional means such as roller or slide bearings or the like for reciprocatory motion limited to a rectilinear path in the direction indicated by the double-headed arrow. The means for supporting body member 2 have not been illustrated in the drawings since they do not, per se, form part of the invention and have accordingly been eliminated in the interest of simplifying the drawings.

For convenience of expression in the following description, and assuming body member 1 to be the fixed member and body member 2 the movable one, member 1 will hereinafter be referred to as the stator element and member 2 the armature element. It is to be understood however, that the invention can be practised equally as well by making the body member 2 the fixed one and body member 1 the movable one.

The stator 1 is made up of two generally C-shaped cores linked by a yoke 3. The ends of the left hand core terminate in one set of pole pieces 4 and 5 while the ends of the right hand core terminate in another set of pole pieces 6 and 7.

The armature 2 similarly includes two C-shaped cores linked by a yoke member 8. The ends of the left hand core in armature 2 terminate in one set of pole pieces 9 and 10 while the ends of the right hand core terminate in another set of pole pieces 11 and 12.

As shown in Fig. 1, stator 1 and armature 2 are in their neutral or zero position of motion wherein each of the pole pieces in armature 2 is disposed in the same spatial relation to a complementary pole piece on the stator 1. That is, the air gaps 13 and 13' magnetically coupling the pole pieces on the stator and armature members are alike from a reluctance point of view for any pair of oppositely disposed pole pieces on the stator and armature such as for example, pole pieces 4—9 and 6—11.

Stator 1 includes an energizing winding 14 surrounding yoke 3 in the space between adjacent arms of the left and right hand cores. Another energizing winding 15 similarly surrounds yoke member 8 in armature 2. For convenience in illustration, only the lower halves of the coil windings 14 and 15 which lie between the adjacent core arms have been shown in section in Figs. 1 and 2. Fig. 1a on the other hand shows both halves of these windings but in a more schematic manner in which each winding is represented by but a single turn. In the illustrated embodiment, windings 14 and 15 are connected in series via conductors 16, 17 and 18 to a source of direct current such as battery 19. Windings 14 and 15, as clearly indicated in Fig. 1a, are so wound and connected to the battery 19 that when energized by the latter, a unidirectional magnetic flux will be set up in the core and yoke elements of the armature and stator. As viewed in Fig. 2, the path taken by this flux, as depicted by the arrows, is seen to follow a generally clockwise direction between the armature and stator, the flux passing downward from the pole pieces of the right hand core of stator 1 into the confronting pole pieces of the right hand core of armature 2, thence via armature yoke 8 into and upward through the left hand core, across the pole pieces of the latter into the confronting pole pieces of the left hand core of the stator, upwardly through the latter into stator yoke 3 and thence downwardly through the right hand core of the stator.

The stator 1 also includes two control windings 20 and 21 surrounding respectively the left and right hand cores. Windings 20 and 21, the lower halves only of which are illustrated in section, are also connected in series by conductors 22, 23 and 24 to a source of current such as alternator 25. Windings 20 and 21, as clearly indicated in Fig. 1a, are so wound and connected to the alternator 25 that at any instant, the electromagnetic field set up by winding 20 in the magnetically coupled left hand cores of the stator and armature elements 1 and 2 is in an opposite direction to the electromagnetic field set up by the current traversing winding 21 in the magnetically coupled right hand cores of the stator and armature elements. This effect is shown clearly in Fig. 3 by the flux distribution arrows. Thus at any instant, the control currents through windings 20 and 21 produce fields of different directional characteristics.

Armature 2 also includes damping windings 26 and 27 surrounding respectively the left and right hand cores, the winding 26 being short circuited by conductor 28 and winding 27 being similarly short circuited by conductor 29. Windings 26 and 27, the upper halves only of which are shown in section in Figs. 1 and 2, improve operation of the motor and their function will be explained hereafter in more detail.

*Operation*

Operation of the basic reciprocating motor construction shown in Fig. 1 is as follows:

With direct current flowing through windings 14—15 and alternating current flowing through control windings 20—21, the resultant electromagnetic field set up within the stator and armature elements 1, 2 will assume a distribution that is unsymmetrical with respect to the pole pieces on these two elements. For example, in Fig. 4 with current flow through the several windings in the directions indicated by the conventional symbols, the unsymmetrical flux distribution will move armature 2 from its neutral position to the left as indicated by the solid arrow to decrease the reluctance of the flux paths across air gaps 13 and 13'. The extent of motion depends upon the dissymmetry of the flux distribution and therefore varies with the magnitude of the control current.

Obviously the armature 2 returns to neutral position as the alternating current wave passes through zero, and the armature continues to move beyond neutral towards the right in the direction of the broken arrow as the current amplitude rises in the reverse direction. The displacement at any instant thus depends upon the polarity and the amplitude of the current at that instant, and the instantaneous speed varies with the rate of change of the current amplitude.

If motion of armature 2 is exactly synchronized with the shift in the distribution of the flux flow between the pole pieces of the stator and armature elements across the air gaps 13 and 13', a unidirectional electromagnetic field flows in the pole pieces 9—10 and 11—12, and in the yoke 8 of the armature 2. Hence, short circuited windings 26 and 27 previously described will likewise be in a unidirectional electromagnetic field. However, if armature 2 does not remain in step with the shift in the distribution of the flux across air gaps 13 and 13', the distribution of the electromagnetic field will change in the pole pieces 9—10, and 11—12 in such a manner that windings 26 and 27 will then be subjected to an alternating electromagnetic field thereby inducing a voltage in them. With windings 26 and 27 short circuited, the current which flows in each of them will set up a field of such direction as to oppose the effect which caused it. Hence, windings 26 and 27 perform a damping function to better maintain motion of armature 2 synchronized with the shift in the distribution of the flux across the air gaps 13 and 13'.

The basic construction of the motor device may, in accordance with this invention, be modified to include more than the single set of control windings 20 and 21 shown in Fig. 1. That is, a plurality of pairs of control windings may be included in the C-shaped portions of stator 1, with each pair of windings being adapted to be energized by currents of different characteristic. Under such conditions, motion of armature 2 will then follow a path determined by the combined electromagnetic effect of all these control currents.

For example, as shown in Fig. 5, paired windings 20' and 21' are connected in series to alternator 25' as in the Fig. 1 arrangement, while paired windings 20" and 21" are connected in series to a source of variable voltage direct current power, such as battery 31. The direction of the electromagnetic field produced by the D. C. winding 20" would be opposite to that produced by winding 21" as indicated by the symbols on the drawing.

In the Fig. 5 arrangement, motion of armature 2 would be determined by the combined electromagnetic effect of the A. C. current through windings 20', 21' and the D. C. current through windings 20" and 21". The stroke and frequency of the reciprocating motion of the armature 2 vary with the amplitude and frequency respectively of the A. C. output from alternator 25' while the center of the reciprocatory motion is determined by the amplitude of the current from battery 31.

With the type of motor construction shown in Fig. 5, a slightly different arrangement and operation could be effected by connecting control windings 20" and 21" in series to a second alternator which could be so designed and coupled with alternator 25' as to have a desired phase and frequency relationship therewith; or the alternator feeding control windings 20" and 21" could be driven separately, if desired.

Another embodiment in which the path of movement of the armature is a plane surface comprises, as shown in Fig. 6, a double motor with stator elements 1a, 1b at opposite sides of a single armature element which, from a functional point of view, divides along the plane of symmetry of the double motor (indicated by the line x—x) into armature sections 2a, 2b disposed in back-to-back relation. Separate damping windings for each section of the double motor may be provided on the armatures but it is preferable, as shown, to employ a single set of damping windings 26' and 27'. The circuit connections to the energizing and control windings may be substantially as shown in Fig. 1, and the reciprocating motion of the common armature element in the direction indicated by the double arrow depends upon the combined electromagnetic effects of the control currents in the two motor sections.

When the particular displacement to be produced is not determined solely by the device itself but is affected by external conditions, the movable armature element 2c may be of bar form with spaced grooves 33 in which copper bars 34 are placed to constitute short-circuited windings, see Fig. 7.

Still another motor construction embodying the invention is shown in Fig. 8. Here it is seen that the physical arrangement is a circular one with an armature element 2d within, and movable axially of, the stator element 1d. The cores and the windings are annular in this particular form of the invention and, as viewed in radial section, conform substantially to the shape and relative arrangement of the parts as shown schematically in Fig. 1.

The short-circuited winding of the armature can be comprised of annular disks. The armature and the short-circuited winding on the same can be formed of a solid iron core, for instance in disk form.

In conclusion it will be evident that the invention herein described constitutes a considerable advance in the art over present known constructions for electromagnetic motors, in that the stroke of the motor, its speed or frequency of reciprocation, and center of reciprocatory movement can all be controlled by purely electrical means.

Motion of the motor is controlled by the simple expedients of controlling the magnitude and frequency of the current in the control windings. While in all the figures of the drawing an alternator is shown as the source of the periodically reversing current applied to the control windings to set up electromagnetic fields of opposite polarities relative to each other it will be understood that the same effect could be obtained by using a direct current source, and a reversing switch in the connections to the control windings. Still other arrangements for energizing the control windings with currents of variable and different characteristics to produce a particular cycle of operation will suggest themselves and are meant to be embraced by the scope of the appended claims.

In all of the arrangements described, the size of the windings and the currents through them will of course be so chosen that the force exerted on the armature member of the motor as the electromagnetic field shifts will be large enough in comparison with the mass of the armature to impart to it a high acceleration solely by the magnetic effect. Thus in the improved motor construction, no resonance phenomena can enter into its operation.

If desired the invention may be used as a generator by taking current from one of the control windings, such current being induced therein by driving the armature element in reciprocating motion from an external source of mechanical power.

I claim:

1. An electromagnetic motor for producing linear reciprocating motion comprising a stator element, an armature element, said stator and armature elements being magnetizable bodies spaced slightly from each other to provide an air gap therebetween, one of said elements including a pair of C-shaped cores bridged by a yoke, the two ends of each said core constituting a set of double pole pieces facing said air gap and the other element including at least one pole piece disposed opposite each said set of double pole pieces, winding means surrounding said yoke and adapted when energized with direct current to establish a single magnetic flux circuit through said elements and across said air gap, and a second winding means comprising at least one winding surrounding a leg of each said core and adapted when energized with alternating current to establish two magnetic flux circuits in opposite directions which each include a part of the armature element and one of said sets of double pole pieces, whereby the simultaneous energization of both said winding means results in a non-uniform flux distribution in the pole pieces of the respective sets of double pole pieces.

2. A motor as defined in claim 1 characterized by the features that said other element is likewise comprised of two C-shaped cores bridged by a yoke, the open ends of the several said cores constituting the oppositely disposed pole pieces of said stator and armature elements.

3. A motor as defined in claim 1 characterized by the features that said other element is likewise comprised of two C-shaped cores bridged by a yoke, the open ends of the several said cores constituting the oppositely disposed pole pieces of said stator and armature elements, and that said other element includes a direct current energized winding surrounding the yoke thereof and which produces a unidirectional magnetic field aiding the other direct current energized winding.

4. A motor as defined in claim 1, and further including damping winding means carried by said other element.

5. A motor device as defined in claim 1, and further including damping winding means carried by said other element, said damping winding means being short circuited.

6. A motor as defined in claim 1 characterized by the features that said stator element comprises at least two body elements disposed in such manner that the respective sets of pole pieces thereon face each other, and that said armature element also comprises at least two body members combined back-to-back into a single structural unit which is disposed between said stator body members to constitute a double motor unit.

7. A motor device as defined in claim 1 characterized by the feature that said other element includes a plurality of grooves, the teeth portions between said grooves constituting the pole pieces for the element, and further including a damping winding disposed in said grooves.

8. A motor as defined in claim 1 characterized by the feature that said second winding means includes a second winding surrounding a leg of each said core, said second windings being adapted to be energized with control currents having characteristics differing from the alternating current energization of the other windings on said core legs.

EDUARD DIEBOLD.

REFERENCES CITED

The following references are of record in the file of this patent:

UNITED STATES PATENTS

| Number | Name | Date |
| --- | --- | --- |
| 680,797 | Mershon | Aug. 20, 1901 |
| 1,554,254 | Zbinden | Sept. 22, 1925 |